United States Patent [19]

Abe

[11] Patent Number: 4,642,729
[45] Date of Patent: Feb. 10, 1987

[54] VARIABLE PORCELAIN CONDENSER STRUCTURE

[75] Inventor: Mikio Abe, Takizawa, Japan
[73] Assignee: Alps Electric Co., Ltd., Japan
[21] Appl. No.: 868,793
[22] Filed: May 29, 1986
[30] Foreign Application Priority Data May 29, 1985 [JP] Japan .............................. 60-79268[U]

[51] Int. Cl.$^4$ ............................................. H01G 5/06
[52] U.S. Cl. ................................................... 361/293
[58] Field of Search ......................................... 361/293

[56] References Cited

U.S. PATENT DOCUMENTS 4,181,923 1/1980 Tatsumi et al. ...................... 361/293
4,500,941 2/1985 Izumi .................................. 361/293

Primary Examiner—Donald A. Griffin
Attorney, Agent, or Firm—Guy W. Shoup

[57] ABSTRACT

Herein disclosed is a variable porcelain condenser structure in which a rotor electrode and a stator electrode are arranged through a ceramic dielectric member. A stator is made of a ceramic dielectric member and formed with the stator electrode on its one side. A rotor is made of a metallic material and formed with the rotor electrode of generally semicircular shape on its one side. Both the stator and the rotor are mounted on the cylindrical bottom of an insulating frame. The aforementioned rotor, stator and insulating frame are held altogether in elastic contact with one another by means of a metal case having several elastic tongues.

3 Claims, 6 Drawing Figures

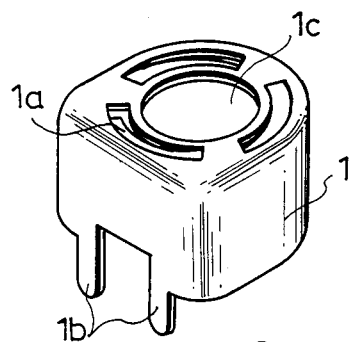
Fig.2(a)
Fig.2(b)
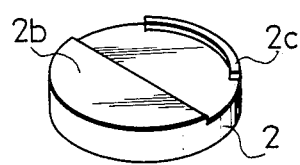
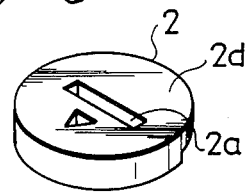
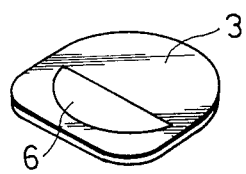
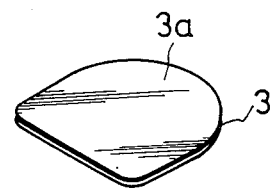
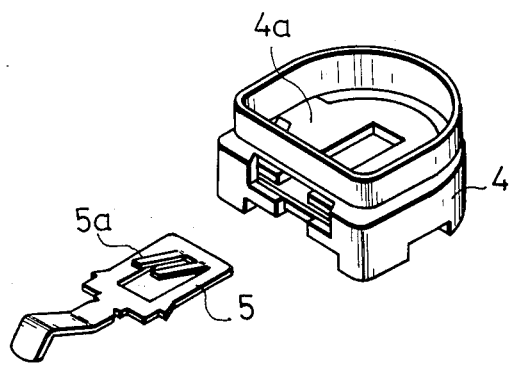

Fig.4(a)
PRIOR ART
Fig.4(b)
PRIOR ART
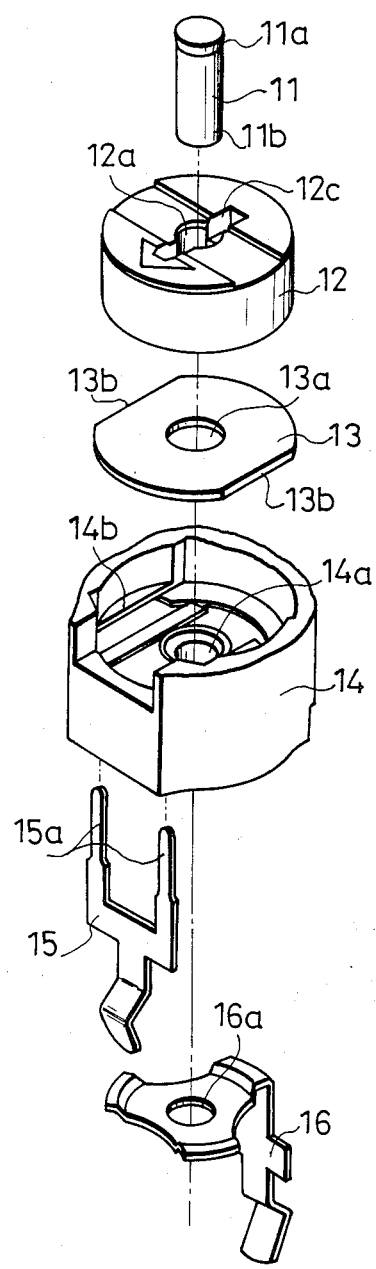
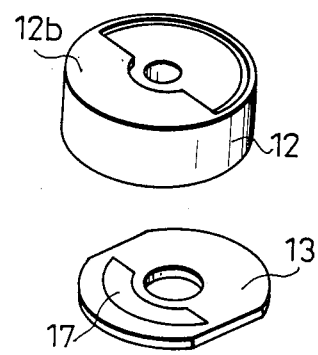

VARIABLE PORCELAIN CONDENSER STRUCTURE

BACKGROUND OF THE INVENTION

1. Field of the Invention

The present invention relates to a variable porcelain condenser in which a rotor electrode and a stator electrode are arranged through a ceramic dielectric member.

2. Description of the Prior Art

Before entering into detailed description of the present invention, cursory review will be made on one example of the variable porcelain condenser of the prior art with reference to FIG. 3 and FIGS. 4(a) and (b). In these Figures, reference numeral 12 indicates a rotor made of a metallic material, which is formed on its one side with a raised, generally semicircular rotor electrode 12b. Indicated at numeral 13 is a stator made of a ceramic dielectric member, which is concentrically formed on its one side with a generally semicircular stator electrode 17 by printing or calcining a silver paste or the like. On the other hand, numeral 15 indicates a stator terminal made of a metallic material, which is inserted or press-fitted into an insulating frame 14 made of an insulating molded member so that it is supported therethrough. Moreover, numeral 16 indicates an earth terminal made of a metallic material, and numeral 11 indicates a rotor shaft made of a metallic material.

Next, the method of assembling the variable porcelain condenser thus constructed will be described in the following.

First of all, the aforementioned stator 13 is so inserted into the aforementioned insulating frame 14 supporting the aforementioned stator terminal 15 therethrough that the stator electrode 17 formed on one side of the stator 13 and the leading end portion 15a of the stator terminal 15 come into contact with each other. Next, the aforementioned rotor 12 is so mounted that the aforementioned rotor electrode 12b comes into contact with the aforementioned stator 13. At this time, the stator 13 has its straight portions 13b retained on the straight portions 14b of the aforementioned insulating frame 14. Moreover, the aforementioned rotor shaft 11 is inserted into the respective center holes 12a, 13a, 14a and 16a of the aforementioned rotor 12, stator 13, insulating frame 14 and earth terminal 16 until its lower portion 11b projecting from the earth terminal 16 is caulked to be held in electric connection with the earth terminal 16. At this time, the aforementioned rotor shaft 11 has its journal 11a held by the stepped portion 12d of the aforementioned rotor 12 so that it is prevented from coming out. As a result, the rotor 12 and the aforementioned earth terminal 16 are electrically connected with each other through the aforementioned rotor shaft 11.

By turning the aforementioned rotor 12 through its adjusting groove 12c by means of a driver (although not shown) or the like, therefore, the opposing areas of the aforementioned rotor electrode 12b and stator electrode 17 can be varied at will so that an arbitrary capacity can be established from the aforementioned stator terminal 15 and rotor terminal 16.

However, the example of the prior art described above has a considerable number of parts and a complicated shape so that it is troubled by its automatic assemblage and finds it difficult to provide a variable porcelain condenser of higher performance at a more reasonable cost.

SUMMARY OF THE INVENTION

It is, therefore, an object of the present invention to eliminate those defects intrinsic to the example of the prior art and to provide a variable porcelain condenser of higher performance at a more reasonable cost.

In order to achieve the above-specified object, therefore, the present invention contemplates to provide a variable porcelain condenser structure in which both a stator made of a ceramic dielectric member and formed with a stator electrode on its one side and a rotor made of a metallic material and formed with a generally semicircular rotor electrode on its one side are mounted on the cylindrical bottom of an insulating frame and in which the aforementioned rotor, stator and insulating frame are held in elastic contact with one another by means of a metal case having several elastic tongues.

BRIEF DESCRIPTION OF THE DRAWINGS

Other objects, features and advantages of the present invention will become apparent from the following description taken with reference to the accompanying drawings, in which:

FIGS. 2(a) and (b) are perspective views showing the parts of the same;

FIGS. 4(a) and (b) are perspective views showing the parts of the same.

DESCRIPTION OF THE PREFERRED EMBODIMENT

Figure 1:
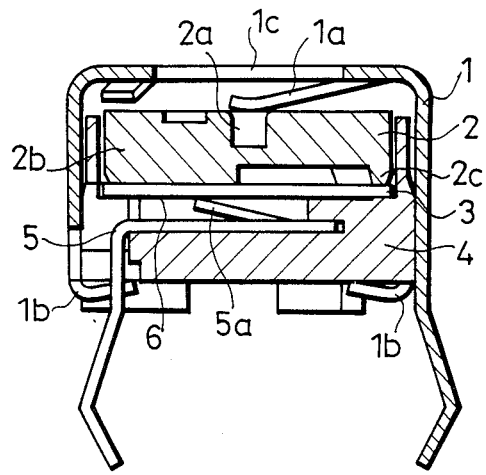
FIG. 1 is a sectional view showing the construction of the variable porcelain condenser according to one embodiment of the present invention.
Figure 3:
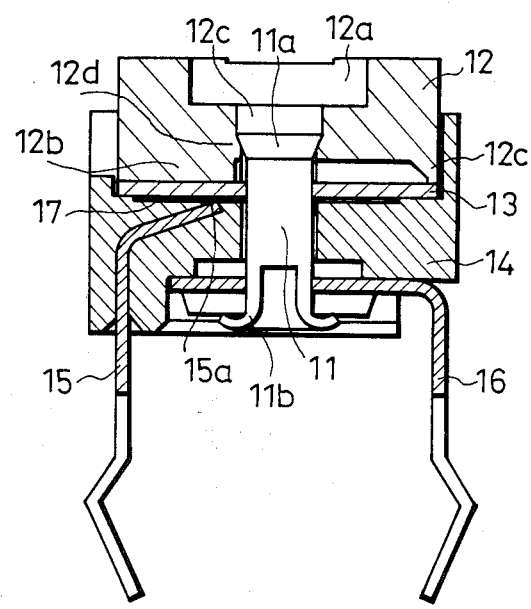
FIG. 3 is a sectional view showing the construction of the example of the prior art.

The present invention will be described in the following in connection with one embodiment thereof with reference to FIG. 1 and FIGS. 2(a) and (b).

In these Figures, reference numeral 2 indicates a rotor which is made of a metallic material by a pressing or the like. This rotor 2 is formed on its one side with a generally semicircular rotor electrode 2b and an auxilary electrode 2c having the same height as the former. Indicated at numeral 3 is, on the other hand, a stator which is made of a ceramic dielectric member. This stator 3 is formed on its one side with a generally semicircular stator electrode 6 which is prepared by printing or calcining a silver paste. Indicated at numeral 5 is a stator terminal made of a metallic material, which is inserted or press-fitted like the example of the prior art into an insulating frame 4 made of an insulating molded member. Indicated at numeral 1 is, on the other hand, a case made of a metallic material, which is formed with several (e.g., three, as shown in FIG. 2(a)) elastic tongues 1a and legs 1b.

Next, the method of assembling the variable porcelain condenser structure according to the present invention will be in the following. The aforementioned stator 3 is so assembled on the cylindrical inner bottom 4a of the aforementioned insulating frame 4 holding the aforementioned stator terminal 5 that the leading end 5a of the stator terminal 5 and the aforementioned stator electrode 6 formed on one side of the stator 3 come into contact with each other. Then, the aforementioned rotor 2 is mounted such that the aforementioned rotor electrode 2b comes into contact with the upper face 3a of the stator 3.

Next, the aforementioned case 1 is brought downward to cover the rotor 2 assembled in the aforementioned insulating frame 4, and its legs 1b are fixed on the insulating frame by a caulking or the like.

This causes the elastic tongues 1a formed from the aforementioned case 1 and the upper face 2d of the aforementioned rotor 2 to come into contact with each other thereby to establish both the electrical connection inbetween and the elastic contact among the aforementioned rotor 2, stator 3 and insulating frame 4. Moreover, it is common with the variable porcelain condenser of the prior art that an arbitrary capacity can be attained by turning an adjusting groove 2a formed in the aforementioned rotor 2 through a center hole 1c of the aforementioned case 1 by means of a driver or the like (although not shown).

As has been described hereinbefore, according to the present invention, both the stator made of the ceramic dielectric member and formed with the stator electrode on its one side and the rotor made of a metallic material and formed with the generally semicircular rotor electrode on its one side are mounted on the cylindrical bottom of the insulating frame, and the aforementioned rotor, stator and insulating frame are held in elastic contact with one another by means of the metal case having the several elastic tongues. As a result, the rotor shaft of the prior art can be dispensed with to reduce the number of parts inclusive. Thus, it is possible to eliminate the disadvantages of the prior art having the considerable number of parts and the complicated shape and to provide a variable porcelain condenser at a reasonable cost.

In the example of the prior art, moreover, the center hole 13a of the aforementioned stator 13 has to be avoided when the stator 13 is to be formed with the stator electrode 17. According to the present invention, however, there is no need for forming any center hole in the aforementioned stator 3 so that the area of the stator electrode 6 can be enlarged. As a result, the stator 3 can be made thicker than the example of the prior art, when the same maximum capacity is to be established, to improve the strength of the ceramic dielectric member making up the stator 3 so that a variable porcelain condenser of higher performance and quality can be provided. Since the variable porcelain condenser according to the present invention has its body covered with the metallic case, moreover, a higher shielding effect can be attained to provide another advantage that the variable porcelain condenser can be freed from the influences of other parts when it is to be actually mounted in the circuit.

What is claimed is:

1. A variable porcelain condenser structure comprising:
   a bottomed, generally cylindrical insulating frame;
   a stator of a ceramic dielectric member having a stator electrode formed on one side and mounted on the bottom of said insulating frame;
   a rotor of a metallic material having a generally semicircular rotor electrode formed on one side and mounted on the bottom of said insulating frame through said stator;
   a case of a metallic material including leg means for fixing said insulating frame and elastic means associated with said leg means for holding said rotor, said stator and said insulating frame in elastic contact with one another and for providing an electrical connection between said case and said rotor; and
   a stator terminal held in said insulating frame and having its leading end contacting electrically with the stator electrode of said stator,
   whereby the opposing areas of said stator electrode and said rotor electrode through said stator can be varied to provide an arbitrary capacity when said rotor is turned relative to said stator.

2. A variable porcelain condenser structure as set forth in claim 1, wherein said leg means includes a plurality of legs formed integrally with said case and having their leading ends abutting against the bottom face of said insulating frame while being kept away from said stator terminal.

3. A variable porcelain condenser structure as set forth in claim 1, wherein said elastic means includes a plurality of tongues formed integrally with said case and contacting with the upper face of said rotor.

* * * * *